US010015480B2

(12) United States Patent
Xie et al.

(10) Patent No.: US 10,015,480 B2
(45) Date of Patent: Jul. 3, 2018

(54) THREE-DIMENSIONAL (3D) DISPLAY MODULE, 3D DISPLAY SYSTEM AND 3D DISPLAY METHOD

(71) Applicant: Tianma Micro-electronics Co., Ltd., Shenzhen (CN)

(72) Inventors: Jia Xie, Shenzhen (CN); Xiaolin Liu, Shenzhen (CN); Xuan Chen, Shenzhen (CN)

(73) Assignee: Tianma Micro-electronics Co., Ltd., Shenzhen (CN)

( * ) Notice: Subject to any disclaimer, the term of this patent is extended or adjusted under 35 U.S.C. 154(b) by 282 days.

(21) Appl. No.: 15/013,980

(22) Filed: Feb. 2, 2016

(65) Prior Publication Data

US 2017/0171531 A1   Jun. 15, 2017

(30) Foreign Application Priority Data

Dec. 14, 2015   (CN) .......................... 2015 1 0925380

(51) Int. Cl.
*G02B 27/01* (2006.01)
*G02B 27/22* (2018.01)
(Continued)

(52) U.S. Cl.
CPC ....... *H04N 13/302* (2018.05); *G02B 27/0101* (2013.01); *H04N 13/0402* (2013.01);
(Continued)

(58) Field of Classification Search
CPC ........ G02B 2027/0134; G02B 27/0101; G02B 21/025; G02B 21/04; G02B 21/22;
(Continued)

(56) References Cited

U.S. PATENT DOCUMENTS 5,515,122 A * 5/1996 Morishima ............ G09B 9/307
353/28
5,982,343 A * 11/1999 Iba ...................... G02B 27/0172
345/8
(Continued)

FOREIGN PATENT DOCUMENTS

CN          2432599 Y      5/2001
CN          1430086 A      7/2003
(Continued)

*Primary Examiner* — Nathnael B Aynalem
(74) *Attorney, Agent, or Firm* — Anova Law Group, PLLC

(57) ABSTRACT

A three-dimensional (3D) display module, a 3D display system and a 3D display method are provided. The 3D display module includes a first plane mirror, a second plane mirror disposed correspondingly to the first plane mirror. A side of the first plane mirror coincides with a side of the second plane mirror to form a dihedral angle between the first plane mirror and the second plane mirror. The 3D display module also includes a first display screen and a second display screen disposed correspondingly to the first display screen. The first display screen and the second display screen are disposed outside the dihedral angle and at two sides of an angle bisecting plane of the dihedral angle, respectively. A first virtual image of the first display screen is overlapped with a second virtual image of the second display screen to form a first 3D virtual image.

16 Claims, 4 Drawing Sheets

(51) Int. Cl.
*H04N 13/302* (2018.01)
*H04N 13/04* (2006.01)

(52) U.S. Cl.
CPC ....... *H04N 13/044* (2013.01); *H04N 13/0459* (2013.01); *G02B 2027/0134* (2013.01)

(58) Field of Classification Search
CPC .............. G02B 27/2235; G02B 27/225; H04N 13/0402; H04N 13/044; H04N 13/0459
See application file for complete search history.

(56) References Cited

U.S. PATENT DOCUMENTS

| | | | |
|---|---|---|---|
| 7,021,937 B2 | 4/2006 | Simpson et al. | |
| 2005/0001982 A1* | 1/2005 | Youn ................... | G02B 27/2235 352/86 |
| 2005/0052617 A1* | 3/2005 | Fujikawa ............. | G02B 27/225 353/10 |
| 2007/0097319 A1* | 5/2007 | McKay ................ | H04N 13/042 353/7 |
| 2013/0094092 A1* | 4/2013 | Imahori ................ | G02B 5/18 359/633 |
| 2015/0077820 A1* | 3/2015 | Someno ................ | G03H 1/02 359/11 |
| 2017/0336614 A1* | 11/2017 | Mercer ................ | G02B 21/22 |

FOREIGN PATENT DOCUMENTS

| | | |
|---|---|---|
| CN | 1432863 A | 7/2003 |
| CN | 101359096 A | 2/2009 |
| CN | 102402009 A | 4/2012 |
| CN | 104827967 A | 8/2015 |
| KR | 20110001743 A | 1/2011 |

\* cited by examiner

400

| Reflecting light emitted from a first image to form a first virtual image, reflecting light emitted from a second image to form a second virtual image is formed at a same position of the first virtual image | 410 |

| Reflecting light emitted from the overlapped first virtual image and the second virtual image to form a magnified virtual image | 420 |

FIG. 4

THREE-DIMENSIONAL (3D) DISPLAY MODULE, 3D DISPLAY SYSTEM AND 3D DISPLAY METHOD

CROSS-REFERENCES TO RELATED APPLICATIONS

This application claims the priority of Chinese patent application No. CN201510925380.4, filed on Dec. 14, 2015, the entire content of which is incorporated herein by reference.

FIELD OF THE DISCLOSURE

The present disclosure relates to the field of display technology and, more particularly, relates to a 3D display module, a 3D display system and a 3D display method thereof.

BACKGROUND

Head Up Display (HUD) utilizes light reflection to project important information to, for example, outside the windshield glass. The windshield glass is partially transparent and partially reflective, i.e., a transflective mirror. When viewers, e.g. driver and/or passengers, look forward through the windshield, they are able to see an outside scene and information displayed on the HUD at the same time. Thus, the driver or the passengers are able to get the important information with their heads positioned "up" and looking forward, instead of looking down to lower instruments.

However, a conventional HUD often generated two-dimensional (2D) images, not 3D images. The disclosed 3D display module, 3D display system and 3D display method are directed to solve one or more problems in the art.

BRIEF SUMMARY OF THE DISCLOSURE

One aspect of the present disclosure provides a three-dimensional (3D) display module. The 3D display module includes a first plane mirror, a second plane mirror disposed correspondingly to the first plane mirror. A side of the first plane mirror coincides with a side of the second plane mirror to form a dihedral angle between the first plane mirror and the second plane mirror. The 3D display module also includes a first display screen and a second display screen disposed correspondingly to the first display screen. The first display screen and the second display screen are disposed outside the dihedral angle and at two sides of an angle bisecting plane of the dihedral angle, respectively. A first virtual image of the first display screen generated by the first plane mirror is overlapped with a second virtual image of the second display screen generated by the second plane mirror to form a first 3D virtual image.

Another aspect of the present disclosure provides a 3D display system. The 3D display system includes a 3D display module. The 3D display module includes a first plane mirror, a second plane mirror disposed correspondingly to the first plane mirror. A side of the first plane mirror coincides with a side of the second plane mirror to form a dihedral angle between the first plane mirror and the second plane mirror. The 3D display module also includes a first display screen and a second display screen disposed correspondingly to the first display screen. The first display screen and the second display screen are disposed outside the dihedral angle and at two sides of an angle bisecting plane of the dihedral angle, respectively. A first virtual image of the first display screen generated by the first plane mirror is overlapped with a second virtual image of the second display screen generated by the second plane mirror to form a first 3D virtual image.

Another aspect of the present disclosure provides a 3D display method. The 3D display method includes providing a first plane mirror and a second plane mirror disposed correspondingly to the first plane mirror. A side of the first plane mirror coincides with a side of the second plane mirror to form a dihedral angle between the first plane mirror and the second plane mirror. The 3D display method also includes providing a first display screen and a second display screen disposed correspondingly to the first display screen. The first display screen and the second display screen are disposed outside the dihedral angle and at two sides of an angle bisecting plane of the dihedral angle, respectively, such that a first virtual image of the first display screen generated by the first plane mirror is overlapped with a second virtual image of the second display screen generated by the second plane mirror to form a first 3D virtual image. The 3D display method also includes providing a third plane mirror, a concave mirror and a transflective mirror disposed correspondingly to the third plane mirror and the concave mirror. The third plane mirror and the concave mirror are disposed between the 3D display module and the transflective mirror, such that light emitted from the overlapped first virtual image and the second virtual image are reflected onto an inner surface of the transflective mirror facing a viewer by the third plane mirror and the concave mirror, light reflected by the inner surface of the transflective mirror is extended backwards to intersect to form a second 3D virtual image, and the second 3D virtual image is a magnified image of the first 3D virtual image.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 4 illustrates a flow chart of an exemplary 3D display method consistent with disclosed embodiments

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
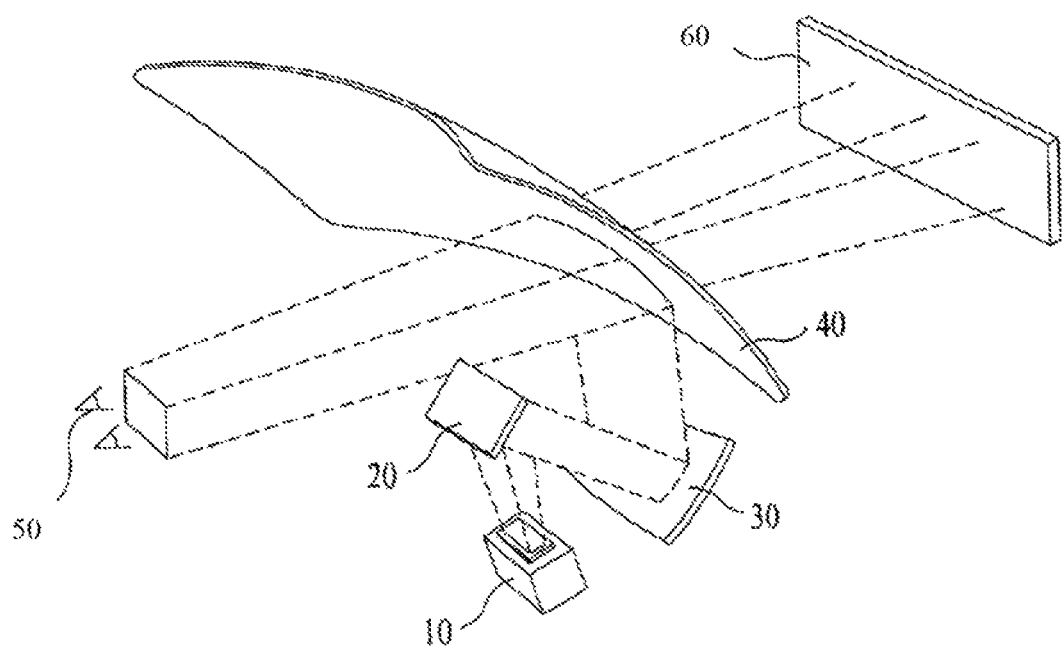
FIG. 1 illustrates a schematic structure of a reflective Head Up Display (HUD)

FIG. 1 illustrates a schematic structure of a reflective Head Up Display (HUD). As shown in FIG. 1, the reflective HUD includes a liquid crystal display (LCD) 10. An image displayed on the LCD 10 is sequentially reflected by a plane mirror 20, a concave mirror 30 and a transflective mirror 40, such that a magnified virtual image 60 is formed behind the transflective mirror 40. That is, the magnified virtual image 60 may be located behind the transflective mirror 40 where light does not really come from.

A viewer 50 is able to observe the virtual image 60 which includes the content displayed by the LCD 10. A magnification of the image displayed on the LCD 10 (i.e., a ratio between the size of the virtual image 60 and the size of the image displayed on the LCD 10) as well as the position of the virtual image 60 are determined by parameters as well as relative positions of the plane mirror 20, the concave mirror 30 and the transflective mirror 40.

However, the final magnified virtual image 60 generated by the reflective HUD is a 2D image, not a 3D image. Viewers often do not satisfy with simply 2D images, rather hope for more vivid 3D images which are closer to human visual perception. The disclosed 3D display module, 3D display system and 3D display method are directed to solve one or more problems in the art.

Figure 2:
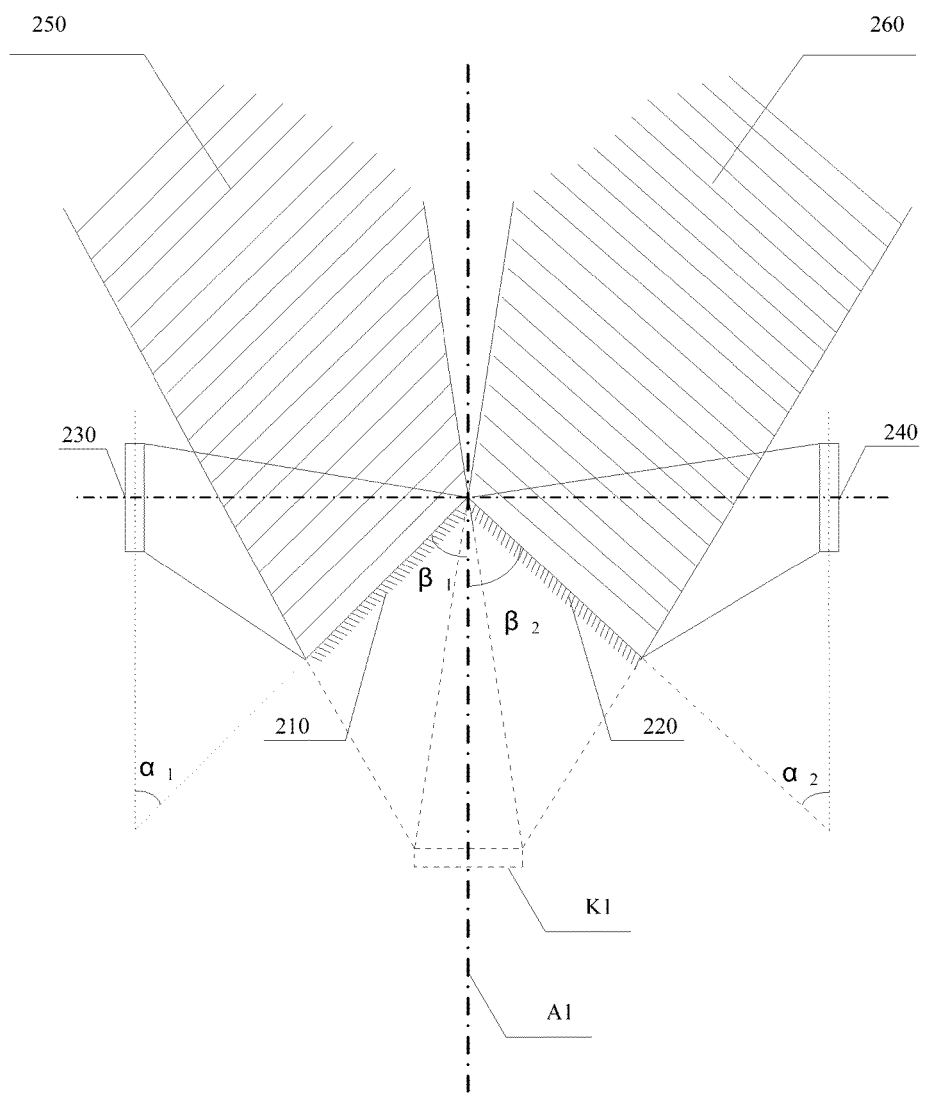
FIG. 2 illustrates a schematic structure of an exemplary three-dimensional (3D) display module consistent with disclosed embodiments.

FIG. 2 illustrates a schematic structure of an exemplary 3D display module consistent with disclosed embodiments. As shown in FIG. 2, the 3D display module 200 may include a first plane mirror 210, a second plane mirror 220, a first display screen 230 and a second display screen 240.

A side of the plane mirror 210 may coincide with a side of the second plane mirror 220, such that a dihedral angle may be formed between the first plane mirror 210 and the second plane mirror 220. An intersection line between the first plane mirror 210 and the second plane mirror 220 may be called as a dihedral line of the dihedral angle. A surface of the first plane mirror 210 and a surface of the second plane mirror 220, which are opposed to each other, may be reflective surfaces.

The first display screen 230 and the second display screen 240 may be disposed outside the dihedral angle. That is, the first display screen 230 may be disposed facing the reflective surface of the first plane mirror 210, and the second display screen 240 may be disposed facing the reflective surface of the second plane mirror 220. In particular, the first display screen 230 and the second display screen 240 may be disposed at two sides of an angle bisecting plane A1 of the dihedral angle, respectively.

A virtual image of the first display screen 230 formed by the first plane mirror 210 may be overlapped with a virtual image of the second display screen 240 formed by the second plane mirror 220. In particular, the virtual image of the first display screen 230 may be located behind the first plane mirror 210 where light does not really come from, and the virtual image of the second display screen 240 may be located behind the second plane mirror 220 where light does not really come from.

As discussed above, the reflective surface of the first plane mirror 210 may be opposed to the reflective surface of the second plane mirror 220, the first display screen 230 and the second display screen 240 may be disposed outside the dihedral angle, especially disposed at two sides of the angle bisecting A1 of the dihedral angle, respectively. Thus, a first image displayed on the first display screen 230 may be only reflected by the first plane mirror 210 and, meanwhile, a second image displayed on the second display screen 240 may be only reflected by the second plane mirror 220.

In one embodiment, the first image displayed on the first display screen 230 may be a left-eye image or a mirror image of a left-eye image of the 3D image, and the second image displayed on the second display screen 240 may be a right-eye image or a mirror image of a right-eye image of the 3D image, in which the 3D image may be directly observed by human eyes. After the first image and the second image are respectively reflected by the first plane mirror 210 and the second plane mirror 220, a first virtual image of the first image and a second virtual image of the second image may be formed at a same position. The first virtual image may be overlapped with the second virtual image, forming a 3D image K1 which may be directly observed by human eyes.

Thus, when the left eye of the viewer is within a shaded area 250 and the right eye of the viewer is within another shaded area 260, the viewer may be able to observe the 3D image K1 based on principles of fusing 3D images. For example, the shaded area 250 may be a viewing zone of the first display screen 230, and the shaded area 260 may be a viewing zone of the second display screen 240.

In another embodiment, the first image displayed on the first display screen 230 may be a right-eye image or a mirror image of a right-eye image of the 3D image, and the second image displayed on the second display screen 240 may be a left-eye image or a mirror image of a left-eye image of the 3D image, in which the 3D image may be directly observed by human eyes. When the right eye of the viewer is within the shaded area 250 and the left eye of the viewer is within the shaded area 260, the viewer may be able to observe the 3D image K1 based on principles of fusing 3D images.

Relative positions of various components included in the 3D display module may be specifically designed, such that the first virtual image may overlap with the second virtual image. For example, the first display screen 230 may have an angle $\alpha 1$ with respect to the first plane mirror 210, and the first plane mirror 210 have an angle $\beta 1$ with respect to the angle bisecting plane A1 of the dihedral angle. The angle $\alpha 1$ and the angle $\beta 1$ may be approximately complementary, i.e., $\alpha 1 + \beta 1 = 90$. On the other hand, the second display screen 240 may have an angle $\alpha 2$ with respect to the second plane mirror 220, and the second plane mirror 220 have an angle $\beta 2$ with respect to the angle bisecting plane A1 of the dihedral angle. The angle $\alpha 2$ and the angle $\beta 2$ may be approximately complementary, i.e., $\alpha 2 + \beta 2 = 90°$.

The first display screen 230 and the second display screen 240 may be a liquid crystal display (LCD) screen capable of displaying image data in a narrow space. In other embodiments, the first display screen 230 and the second display screen 240 may be any appropriate type of display screen, such as plasma display panel (PDP) display screen, field emission display (FED) screen, cathode ray tube (CRT) display screen, liquid crystal display (LCD) screen, organic light emitting diode (OLED) display screen, light emitting diode (LED) display screen, or other types of display screen.

The viewing zone of the first display screen 230 and the viewing zone of second display screen 240 may have a same dimension. Thus, in one embodiment, when the first display screen 230 and the second display screen respectively display a left-eye image and a right-eye image of a 3D image which may be directly observed by human eyes, for example, an autostereoscopic 3D image, through the disclosed 3D display module 200, the left-eye image and the right-eye image may be overlapped to generate the autostereoscopic 3D image.

Further, to realize a better 3D viewing experience of the autostereoscopic 3D image generated from the overlapped left-eye image and the right-eye image, the first display screen 230 and the second display screen 240 may have a same resolution.

The first display screen 230 and the second display screen 240 may have an axially symmetrical shape, respectively. For example, according to various applications, the first display screen 230 and the second display screen 240 may have a rectangular shape, a circular shape or an oval shape, etc.

The first display screen 230 and the second display surface 240 may be symmetrical with respect to the angle bisecting plane A1 of the dihedral angle. For example, the first display screen 230 and the second display screen 240 may have an equal distance to the angle bisecting plane A1, respectively, and both the first display screen 230 and the second display surface 240 may be parallel to the angle bisecting plane A1.

An orthographic projection of the dihedral line of the dihedral angle on the first display screen 230 may coincide with a symmetrical axis of the first display screen 230 and, meanwhile, an orthographic projection of the dihedral line of the dihedral angle on the second display screen 240 may coincide with a symmetrical axis of the second display screen 240. That is, the orthographic projection of the dihedral line of the dihedral angle on the first display screen 230 may be within a symmetrical plane of the first display screen 230 and, meanwhile, the orthographic projection of the dihedral line of the dihedral angle on the second display screen 240 may be within a symmetrical plane of the second display screen 240.

The dihedral angle between the first plane mirror 210 and the second plane mirror 220 may be an approximately right angle. That is, $\beta1+\beta2=90°$. Further, $\beta1=\beta2$, $\alpha1+\beta1=90°$, and $\alpha2+\beta2=90°$, thus, $\alpha1=\alpha2=\beta1=\beta2=45°$.

Figure 3:
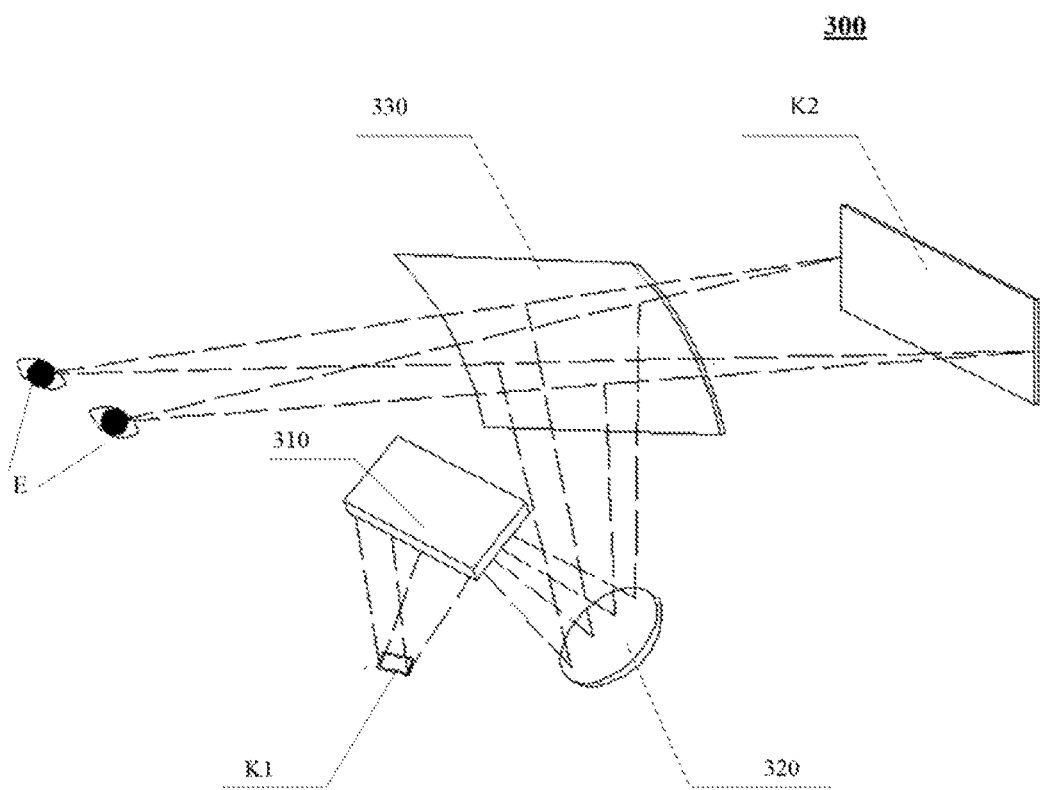
FIG. 3 illustrates a schematic structure of an exemplary 3D display system consistent with disclosed embodiments.

FIG. 3 illustrates a schematic structure of an exemplary 3D display system consistent with disclosed embodiments. As shown in FIG. 3, the 3D display system 300 may include the 3D display module in FIG. 2.

If a 3D display system only includes the 3D display module in FIG. 2, the 3D display system may only be able to overlap a first virtual image of a first image displayed on a first display screen and a second virtual image of a second image displayed on a second display screen to generate a 3D image. In particular, the 3D image may have a same size as the first virtual image and the second virtual image, i.e., the first image and the second image.

In practical applications, to generate a 3D image suitable for the viewer to observer directly, it may be desired for the first display screen and the second display to have a considerable size, respectively. However, some applications involving the disclosed 3D display system may be performed within a narrow space, which may cause difficulties for large size display screens.

Thus, to widen the scope of applications of the 3D display system, in certain embodiments, the 3D display system 300 may be able to display magnified 3D images. When the 3D display system is applied, for example, in a car, the viewers, e.g. driver and/or passengers, may be able to observe an outside scene and a magnified 3D image at the same time.

As shown in FIG. 3, in addition to the 3D display module, the 3D display system 300 may further include a third plane mirror 310, a concave mirror 320 and a transflective mirror 330. The transflective mirror 330 may be partially transparent and partially reflective.

The third plane mirror 310 and the concave mirror 320 may be disposed between the 3D display module and the transflective mirror 330. A first virtual image and a second virtual image, which are generated by the 3D display module, may be reflected by the third plane mirror 310, the concave mirror 320 and an inner surface of the transflective mirror 330. The inner surface of the transflective mirror 330 may face the viewer. That is, light emitted from the first virtual image and the second virtual image may be first reflected onto the third plane mirror 310, and then reflected onto the inner surface of the transflective mirror 330 through the third plane mirror 310 and the concave mirror 320.

Further, light reflected by the inner surface of the transflective mirror 330 may be extended backwards to intersect to form a magnified virtual image of the first virtual image and a magnified virtual image of the second virtual image. The magnified virtual image of the first virtual image and the magnified virtual image of the second virtual image may be formed at a same position and overlapped.

That is, the virtual image K1 generated by overlapping the first virtual image and the second virtual image may be reflected by the third plane mirror 310 to be a third virtual image. The third virtual image may be reflected and magnified by the concave mirror 320, and then a magnified virtual image K2 may be generated through the transflective mirror 330. The magnified virtual image K2 may be an overlapped image of the magnified virtual image of the first virtual image and the magnified virtual image of the second virtual image. When the viewer is at a proper position, for example, a position E shown in FIG. 3, the viewer may be able to observe the magnified 3D virtual image K2 conveniently based on principles of fusing 3D images.

Thus, even small-size display screens are adopted, a virtual image (i.e., the image K2) suitable for the viewer to observe at a desired size may also be generated.

A magnification of the virtual image K1 (i.e., a ratio between the virtual image K2 size and the virtual image K1 size) and/or a position of the virtual image K2 may be modified, for example, through adjusting relative positions of the third plane mirror 310 and the concave mirror 320, and/or through adjusting the parameters of the transflective mirror 330. In certain embodiments, the transflective mirror 330 may have an optical magnification capability, in certain other embodiments, the transflective mirror 330 may not have an optical magnification capability. Such adjustment may be performed during product configuration or during operation in real-time.

The disclosed 3D display system may be applied, for example, in a car. The windshield glass of the car may serve as the transflective mirror of the 3D display system. According to the position and inclination angle of the windshield glass, the relative positions of 3D display module, the third plane mirror and the concave mirror may be adaptively adjusted. Thus, the virtual image K2 may be projected to a position which is suitable for the viewer (e.g., a driver) to observe. Thus, when the viewers look forward through the windshield, they are able to see an outside scene and the 3D virtual image K2 at the same time. The 3D virtual image K2 may include important information, such as speed, warning signals and indicator arrows for navigation. Thus, the driver or the passengers are able to get the important information with their heads positioned "up" and looking forward, instead of looking down to lower instruments (e.g., the dashboard of the car) or a secondary display (e.g., a GPS). Further, the third plane mirror 310 and the concave mirror 320 may fold the optical path, to improve the 3D display module mechanical layout compatibility with available under-dash volume.

In another embodiment, if the 3D virtual image K2 is not desired to be magnified, the 3D virtual image K1 may be directly projected to the inner surface of the transflective mirror 330 without any optical magnification capability, forming the 3D virtual image K2 with a same size as the 3D virtual image K1. That is, the third plane mirror 310 and the concave mirror 320 may be removed from the 3D display system, or the third plane mirror 310 and the concave mirror 320 may be adjusted to be no longer within the optical path of the 3D display system.

In another embodiment, the concave mirror 320 may be replaced by a fourth plane mirror, the 3D virtual image K1 may be reflected by the third plane mirror 310 and the fourth plane mirror to the inner surface of the transflective mirror 330 without any optical magnification capability, forming the 3D virtual image K2 with a same size as the 3D virtual image K1. The third plane mirror 320 and the fourth plane mirror may fold the optical path to, for example, save the space, to improve the 3D display module mechanical layout compatibility.

In another embodiment, the concave mirror 320 may be replaced by the fourth plane mirror, the 3D virtual image K1 may be reflected by the third plane mirror 310 and the fourth plane mirror to the inner surface of the transflective mirror 330 with an optical magnification capability, forming the magnified 3D virtual image K2.

FIG. 4 illustrates a flow chart of an exemplary 3D display method consistent with disclosed embodiments. The method 400 may include following steps.

Step S401: a first plane mirror reflects a first image displayed on a first display screen to be a first virtual image, and a second plane mirror reflects a second image displayed on a second display screen to be a second virtual image at a same position of the first virtual image. In particular, the first virtual mage and the second virtual image may be a pair of view images of a 3D image.

For example, in one embodiment, the first image displayed on the first display screen may be a left-eye image or a mirror image of a left-eye image of the 3D image, and the second image displayed on the second display screen may be a right-eye image or a mirror image of a right-eye image of the 3D image, in which the 3D image may be directly observed by human eyes, e.g., an autostereoscopic 3D image.

In another embodiment, the first image displayed on the first display screen may be a right-eye image or a mirror image of the right-eye image of the 3D image, and the second image displayed on the second display screen may be a left-eye image or a mirror image of a left-eye image of the 3D image, in which the 3D image may be directly observed by human eyes, e.g., an autostereoscopic 3D image.

Step S420: the overlapped first virtual image and the second virtual image are reflected by a third plane mirror, a concave mirror, an inner surface of a transflective mirror, forming a magnified virtual image. That is, light emitted from the first virtual image and the second virtual image may be reflected onto the inner surface of the transflective mirror by the third plane mirror and the concave mirror, and then the light reflected by the inner surface of the transflective mirror may be extended backwards to intersect to form the magnified virtual image. The magnified virtual image may be an overlapped image of the magnified virtual image of the first virtual image and the magnified virtual image of the second virtual image.

In the disclosed embodiments, one side of the first plane mirror and one side of the second plane mirror may coincide to form a dihedral angle between the first plane mirror and the second plane mirror. Two outside surfaces of the dihedral angle may be two reflective surfaces. That is, the reflective surface of the first plane mirror may be opposed to the reflective surface of the second plane mirror. The first display screen and the second display screen may be disposed outside the dihedral angle, in particular, disposed at two sides of an angle bisecting plane of the dihedral angle, respectively.

It should be noted that, the flowchart included in the present disclosure illustrate possible architectures, functions and operations which may be achieved by the disclosed system, method and computer-readable medium. From this aspect, each block in the flowchart may represent a module, a program segment, or a code segment. The module, the program segment or the code segment may include one or more executable instructions to achieve predesigned logical functions. Further, the steps denoted in the blocks may be carried out in a different order. For example, steps in two successive blocks may be executed approximately in parallel, or in a reverse order, depending on the predesigned logical functions.

Those of skill would further appreciate that the various illustrative steps and/or combinations of steps disclosed in the embodiments may be implemented as electronic hardware, computer software, or combinations of both. To clearly illustrate this interchangeability of hardware and software, various illustrative steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm disclosed in the embodiments may be embodied directly in hardware, in a software module executed by a processor, or in a combination of the two. A software module may reside in RAM, flash memory, ROM, EPROM (erasable programmable read-only memory), EEPROM (electrically erasable programmable read-only memory), registers, hard disk, a removable disk, a CD-ROM, or any other form of storage medium known in the art.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A three-dimensional (3D) display module, comprising:
   a first plane mirror;
   a second plane mirror disposed correspondingly to the first plane mirror, wherein a side of the first plane mirror coincides with a side of the second plane mirror to form a dihedral angle between the first plane mirror and the second plane mirror;
   a first display screen; and a second display screen disposed correspondingly to the first display screen, wherein, the first display screen and the second display screen are disposed outside the dihedral angle and at two sides of a plane bisecting the dihedral angle, respectively, a first virtual image of the first display screen generated by the first plane mirror and a second virtual image of the second display screen generated by the second plane mirror are formed at a same position, and the first virtual image is overlapped with the second virtual image to form a first 3D virtual image, the first display screen has an angle $\alpha 1$ with respect to the first plane mirror, the first plane mirror has an angle $\beta 1$ with respect to the plane bisecting the dihedral angle, the angle $\alpha 1$ and the angle $\beta 1$ are complementary, the second display screen has an angle $\alpha 2$ with respect to the second plane mirror, the second plane mirror has an angle $\beta 2$ with respect to the plane bisecting the dihedral angle, the angle $\alpha 2$ and the angle $\beta 2$ are complementary, the first display screen has an axially symmetrical shape;

the second display screen has an axially symmetrical shape;

the first display screen and the second display screen are symmetrical with respect to the plane bisecting the dihedral angle;

an orthographic projection of a dihedral line of the dihedral angle on the first display screen coincides with a symmetrical axis of the first display screen, wherein an intersection line between the first plane mirror and the second plane mirror is the dihedral line of the dihedral angle, and an orthographic projection of the dihedral line of the dihedral angle on the second display screen coincides with a symmetrical axis of the second display screen.

2. The 3D display module according to claim 1, wherein:

a first viewing zone of the first display screen and a second viewing zone of the second display screen have a same dimension.

3. The 3D display module according to claim 1, wherein:

the dihedral angle is a right dihedral angle.

4. The 3D display module according to claim 1, wherein:

a 3D image to be displayed includes at least a pair of view images;

the first display screen displays a left-eye image or a mirror image of the left-eye image in the pair of view images of the 3D image;

the second display screen displays a right-eye image or a mirror image of the right-eye image in the pair of the 3D image; and the first 3D virtual image is a virtual image of the 3D image to be displayed.

5. The 3D display module according to claim 1, wherein:

the 3D display is an autostereoscopic 3D display.

6. A 3D display system, comprising:

a 3D display module according to claim 1.

7. The 3D display system according to claim 6, further including:

a third plane mirror;

a concave mirror; and a transflective mirror disposed correspondingly to the third plane mirror and the concave mirror, wherein the third plane mirror and the concave mirror are disposed between the 3D display module and the transflective mirror, light emitted from the overlapped first virtual image and the second virtual image are reflected onto an inner surface of the transflective mirror facing a viewer by the third plane mirror and the concave mirror, light reflected by the inner surface of the transflective mirror is extended backwards to intersect to form a second 3D virtual image, and the second 3D virtual image is a magnified image of the first 3D virtual image.

8. The 3D display system according to claim 7, wherein:

the viewer observes the second 3D virtual image and an outside scene at the same time when looking through the transflective mirror.

9. The 3D display system according to claim 6, further including:

a transflective mirror without any optical magnification capability, wherein light emitted from the overlapped first virtual image and the second virtual image are projected onto the inner surface of the transflective mirror, and light reflected by the inner surface of the transflective mirror is extended backwards to intersect to form a second 3D virtual image with a same size as the first 3D virtual image.

10. The 3D display system according to claim 6, further including:

a third plane mirror;

a fourth plane mirror a transflective mirror without any optical magnification capability disposed correspondingly to the third plane mirror and the fourth plane mirror, wherein the third plane mirror and the fourth plane mirror are disposed between the 3D display module and the transflective mirror, light emitted from the overlapped first virtual image and the second virtual image are reflected onto the inner surface of the transflective mirror through the third plane mirror and the fourth plane mirror, and light reflected by the inner surface of the transflective mirror is extended backwards to intersect to form a second 3D virtual image with a same size as the first 3D virtual image.

11. A 3D display method, comprising:

providing a first plane mirror;

providing a second plane mirror disposed correspondingly to the first plane mirror, wherein a side of the first plane mirror coincides with a side of the second plane mirror to form a dihedral angle between the first plane mirror and the second plane mirror;

providing a first display screen;

providing a second display screen disposed correspondingly to the first display screen, wherein:

the first display screen and the second display screen are disposed outside the dihedral angle and at two sides of a plane bisecting the dihedral angle, respectively, such that a first virtual image of the first display screen generated by the first plane mirror and a second virtual image of the second display screen generated by the second plane mirror are formed at a same position, and the first virtual image is overlapped with the second virtual image to form a first 3D virtual image, the first display screen has an angle $\alpha 1$ with respect to the first plane mirror, the first plane mirror has an angle β1 with respect to the plane bisecting the dihedral angle, the angle α1 and the angle β1 are complementary, the second display screen has an angle α2 with respect to the second plane mirror, the second plane mirror has an angle β2 with respect to the plane bisecting the dihedral angle, the angle α2 and the angle β2 are complementary, the first display screen has an axially symmetrical shape;

the second display screen has an axially symmetrical shape;

the first display screen and the second display screen are symmetrical with respect to the plane bisecting the dihedral angle;

an orthographic projection of a dihedral line of the dihedral angle on the first display screen coincides with a symmetrical axis of the first display screen, wherein an intersection line between the first plane mirror and the second plane mirror is the dihedral line of the dihedral angle, and an orthographic projection of the dihedral line of the dihedral angle on the second display screen coincides with a symmetrical axis of the second display screen;

providing a third plane mirror;

providing a concave mirror; and providing a transflective mirror disposed correspondingly to the third plane mirror and the concave mirror, wherein the third plane mirror and the concave mirror are disposed between the 3D display module and the transflective mirror, such that light emitted from the overlapped first virtual image and the second virtual image are reflected onto an inner surface of the transflective mirror facing a viewer by the third plane mirror and the concave mirror, light reflected by the inner surface of the transflective mirror is extended backwards to intersect to form a second 3D virtual image, and the second 3D virtual image is a magnified image of the first 3D virtual image.

12. The 3D display method according to claim 11, wherein:

a first viewing zone of the first display screen and a second viewing zone of the second display screen have a same dimension.

13. The 3D display method according to claim 11, wherein:

the dihedral angle is a right dihedral angle.

14. The 3D display method according to claim 11, wherein:

a 3D image to be displayed includes at least a pair of view images;

the first display screen displays a left-eye image or a mirror image of the left-eye image in the pair of view images of the 3D image;

the second display screen displays a right-eye image or a mirror image of the right-eye image in the pair of the 3D image; and the first 3D virtual image is a virtual image of the 3D image to be displayed.

15. The 3D display method according to claim 11, wherein:

the 3D display is an autostereoscopic 3D display.

16. The 3D display method according to claim 11, wherein:

the viewer observes the second 3D virtual image and an outside scene at the same time when looking through the transflective mirror.

* * * * *